US006416833B1

(12) United States Patent
Climenhage et al.

(10) Patent No.: US 6,416,833 B1
(45) Date of Patent: Jul. 9, 2002

(54) INTERPOLYMER FILM POUCH

(75) Inventors: David Charles Climenhage, Orono; Anthony Chow, Scarborough, both of (CA)

(73) Assignee: DuPont Canada Inc., Mississauga ( * ) Notice: Subject to any disclaimer, the term of this patent is extended or adjusted under 35 U.S.C. 154(b) by 0 days.

(21) Appl. No.: 09/135,187

(22) Filed: Aug. 17, 1998

Related U.S. Application Data

(60) Provisional application No. 60/056,900, filed on Aug. 22, 1997.

(51) Int. Cl.[7] ............... B29D 23/00; B32B 27/32; B32B 31/02
(52) U.S. Cl. ............... 428/35.2; 428/35.7; 428/36.9; 428/200; 428/220; 428/347; 428/500; 428/515; 428/516; 428/517; 428/521
(58) Field of Search ............... 428/35.2, 35.7, 428/36.9, 200, 220, 347, 500, 515, 516, 517, 521

(56) References Cited

U.S. PATENT DOCUMENTS

| 4,503,102 A | 3/1985 | Mollison ............... 428/35 |
| 4,521,437 A | 6/1985 | Storms ............... 426/130 |
| 5,272,236 A | 12/1993 | Lai et al. ............... 526/348.5 |
| 5,278,272 A | 1/1994 | Lai et al. ............... 526/348.5 |
| 5,288,531 A | 2/1994 | Falla et al. ............... 428/35.2 |
| 5,360,648 A | 11/1994 | Falla et al. ............... 428/35.2 |
| 5,382,630 A | 1/1995 | Stehling et al. ............... 525/240 |
| 5,508,051 A | 4/1996 | Falla et al. ............... 426/392 |
| 5,582,923 A | 12/1996 | Kale et al. ............... 428/523 |
| 5,869,575 A | 2/1999 | Kolthammer et al. ....... 525/240 |
| 5,972,443 A | * 10/1999 | Breck et al. ............... 428/35.2 |

FOREIGN PATENT DOCUMENTS

| CA | 460963 | 9/1957 | |
| CA | 893216 | 2/1972 | |
| WO | WO93/03093 | 2/1993 | |
| WO | WO95/10566 | 4/1995 | |
| WO | WO95/21743 | 8/1995 | |
| WO | WO 96 16119 | 5/1996 | ............ C08L/23/04 |
| WO | WO 97 44371 | 11/1997 | ............ C08F/210/16 |

OTHER PUBLICATIONS

The Wiley Encyclopedia of Packaging Technology.

* cited by examiner

*Primary Examiner*—Harold Pyon
*Assistant Examiner*—Sandra M. Nolan

(57) ABSTRACT

A pouch for containing a flowable material, said pouch being made from a film in tubular form and having transversely heat-sealed ends, said film being made from at least one layer of a material comprising about 50 to about 100 parts by weight of a hybrid interpolymer of ethylene and a $C_3$–$C_{20}$ alpha-olefin made by a polymerization process using both a metallocene catalyst and a Zeigler-Natta catalyst, the hybrid interpolymer having a density of from about 0.910 to about 0.940 g/cm$^3$, a melt index of from about 0.1 to about 2.0 dg/min, and a melt strength of greater than about 3.5 Centi Newtons as determined using a Goettfert Rheotens unit at 190° C. and from 0 to about 50 parts by weight of a high-pressure polyethylene having a density of from about 0.916 to about 0.924 g/cm$^3$ and a melt index of from about 0.01 to about 10 dg/min. Also described is a process for making such pouches.

14 Claims, No Drawings

INTERPOLYMER FILM POUCH

This application claims benefit of U.S. Provisional Application Serial No. 60/056,900, filed on Aug. 22, 1997, the disclosures of which are incorporated herein by reference.

FIELD OF THE INVENTION

Sealing properties of films are key to their effective use in many packaging applications, such as for example fluid containing disposable pouches that may be manufactured on form, fill and seal equipment employing either impulse or thermic sealing techniques; vacuum packages for irregular shaped products and for prepared meats, cheeses and the like; shrink wrapped poultry; and skin packaging. While this invention is directed to all forms of packaging, it is of particular value in the area of liquid packaging, namely for the manufacture of liquid containing pouches.

This invention relates to pouches for flowable materials made from films formed from a new class of ethylene-alpha-olefin interpolymers that demonstrate superior performance in pouches for foods, such as milk.

BACKGROUND OF THE INVENTION

Packaging machinery is being designed to operate at faster speeds all the time. Such machinery requires lower sealing temperatures and hence improved hot tack strength in films to be used to make packaging with such machines. While hot tack strength is often a good indicator of whether a film will produce an excellent pouch, other properties are proving to be of equal or greater significance, for example, melt strength.

Metallocene ethylene-octene or ethylene-hexene interpolymers are available commercially in the density range from 0.80 to 0.915 gm /cc. These densities are too low in modulus to be used alone to make pouches for flowable materials. They must be either blended with Zeigler-Natta interpolymers or used in co-extrusions to form liquid pouches. As a class of polymer they are much more expensive than conventional Zeigler-Natta linear low density polyethylene (LLDPE) and do not, on their own, possess the optimum balance of properties for liquid pouch applications.

The standard polymer of the liquid pouch industry is the copolymer of ethylene-octene polymerized with Zeigler-Natta catalysts. While these polymers offer acceptable performance there is room to reduce the incidence of field failure of pouches caused by punctures, or seal failure through property improvement.

There are now available a new class of polymers which are referred to as hybrid Zeigler-Natta/Metallocene catalyst interpolymers. These are formed of ethylene and $C_4$ to $C_{10}$ alpha-olefins produced by a polymerization process using multiple reactors (minimum of 2) in series or in parallel or both. The process uses both Zeigler-Natta and Metallocene catalysts, preferably in separate reactors to produce hybrid interpolymers with advantageous properties for liquid packaging. The catalysts are the known metallocene or single-site catalysts and the Zeigler-Natta catalysts, both of which are well documented in the catalyst art.

Hot tack strength is the ability of a film to seal under stress while still in a molten state. This property is one of the most critical in packaging applications where machines run at high speeds and sealing takes place between molten sealing components of a package, thereby placing the sealing components, and hence the seal under stress when the package is formed, filled and, sealed.

It should be noted that in the case of fluid containing pouches made on form, fill and seal equipment, there appears to be a correlation between seal leaker frequency and hot tack strength. This is supported by data gathered in the dairy industry.

As noted, the development of single site catalyst (SSC) or metallocene technology has brought about an improved class of polymers ranging from crystalline to elastomeric materials. These polymers have features such as improved impact strength and toughness, better melt characteristics, because of the control over molecular structure, and better clarity. Exxon and Dow have developed SSC or metallocene polymers and each has the benefit of a number of patents relating to these polymers. Exxon is said to use mono- and bis-cyclopentadienyl metallocenes, while Dow's focus is on titanium cyclopentadienyl metallocenes, which it calls "constrained geometry catalysts".

In practice, Exxon produces ethylene-butene and ethylene-hexene polymers, while Dow makes ethylene-octene polymers of the metallocene or SSC type. Dow claims that its metallocene or SSC polymers are different as they have uniformly introduced comonomers and long chain branching that improve processability in otherwise linear polymers.

BACKGROUND ART

Examples of the non-hybrid polymers of Exxon are found in the following patents and applications, the disclosures of which are incorporated herein by reference: U.S. Pat. No. 5,382,630 issued Jan. 17, 1995 to Stehling et al and WO093/03093 published Feb. 18, 1993 to Meka et al. These resins are available commercially from Exxon under the Brand name EXACT™.

Examples of the non-hybrid polymers of Dow are found in the following U.S. patents, the disclosures of which are incorporated herein by reference: U.S. Pat. No. 5,508,051 issued Apr. 16, 1996 to Falla et al; U.S. Pat. No. 5,360,648 issued Nov. 1, 1994 to Falla et al; U.S. Pat No, 5,278,272 issued Jan. 11, 1994 to Lai et al; and U.S. Pat. No. 5,272,236 issued Dec. 21, 1993 to Lai et al. These resins are available commercially under the Brand name AFFINITY™.

In DUPONT CANADA INC.'s PCT International Publication WO 95/10566 published Apr. 20, 1995, the disclosure of which is incorporated herein by reference, there are disclosed pouches for flowable materials wherein the sealant film is made from a SSC linear copolymer of ethylene and at least one $C_4$–$C_{10}$ alpha-olefin. Blends of these SSC interpolymers with at least one polymer selected from multi site catalyst linear interpolymers of ethylene and at least one $C_4$–$C_{10}$ alpha-olefin, a high pressure polyethylene and blends thereof.

In DUPONT CANADA INC.'s PCT International Publication WO 95/21743 published Aug. 17, 1995, the disclosure of which is incorporated herein by reference, there is disclosed an ethylene copolymer film of improved stiffness for use in the manufacture of fluid containing pouches. Typically, the structure comprises an interposed layer of polyethylene having a thickness in the range of 5 to 20 microns and a density of at least 0.93 gm/cc and a melt index of from about 1 to 10 dg/minute, the at least one outer layer being a SSC or metallocene polyethylene/alpha-olefin film which may have a density in the range of 0.88 to 0.93 gm/cc. The only requirements placed on the stiffening interposed layer are that it be of a particular thickness and density. These properties are greater in the stiffening layer than in the metallocene or SSC layer(s). This application indicates that the stiffening layer is included in order for the fluid containing pouch to stand up properly so that fluid may be poured from it when the pouch is placed in a supporting container.

DUPONT CANADA INC.'s U.S. Pat. No. 4,503,102 (Mollison) and U.S. Pat. No. 4,521,437(Storms), the disclosures of which are incorporated by reference, disclose a polyethylene film for use in a form, fill and seal process for the manufacture of a disposable pouch for liquids such as milk. U.S. Pat. No. 4,503,102 discloses pouches made from a blend of a linear ethylene copolymer of ethylene and a $C_4$–$C_{10}$ α-olefin and an ethylene-vinyl acetate polymer copolymerized from ethylene and vinyl acetate. The linear polyethylene copolymer has a density of from 0.916 to 0.930 g/cm$^3$ and a melt index of from 0.3 to 2.0 g/10 minutes. The ethylene-vinyl acetate polymer has a weight ratio of ethylene to vinyl acetate from 2.2:1 to 24:1 and a melt index of from 0.2 to 10 g/10 minutes. The blend disclosed in Mollison U.S. Pat. No. 4,503,102 has a weight ratio of linear low density polyethylene to ethylene-vinyl acetate polymer of from 1.2:1 to 24:1. U.S. Pat. No. 4,503,102 also discloses multi layer films having as a sealant film the aforementioned blend.

U.S. Pat. No. 4,521,437 (Storms) describes pouches made from a sealant film which is from 50 to 100 parts of a linear copolymer of ethylene and octene-1 having a density of from 0.916 to 0.930 g/cm$^3$ and a melt index of 0.3 to 2.0 g/10 minutes and from 0 to 50 parts by weight of at least one polymer selected from the group consisting of a linear copolymer of ethylene and a $C_4$–$C_{10}$-alpha-olefin having a density of from 0.916 to 0.930 g/cm$^3$ and a melt index of from 0.3 to 2.0 g/10 minutes, a high-pressure polyethylene having a density of from 0.916 to 0.924 g/cm$^3$ and a melt index of from 1 to 10 g/10 minutes and blends thereof.

The sealant film disclosed in U.S. Pat. No. 4,521,437 is selected on the basis of providing (a) pouches with an M-test value substantially smaller, at the same film thickness, than that obtained for pouches made with film of a blend of 85 parts of a linear ethylene/butene-I copolymer having a density of about 0.919 g/cm$^3$ and a melt index of about 0.75 g/10 minutes and 15 parts of a high pressure polyethylene having a density of about 0.918 g/cm$^3$ and a melt index of 8.5 g10 minutes, or (b) an M(2)-test value of less than about 12%, for pouches having a volume of from greater than 1.3 to 5 liters, or (c) an M(1.3)-test value of less than about 5% for pouches having a volume of from 0.1 to 1.3 liters. The M, M(2) and M(1.3)-tests are defined pouch drop tests for U.S. Pat. No. 4,521,437. The pouches may also be made from composite films in which the sealant film forms at least the inner layer.

In Falla et al U.S. Pat. No. 5,288,531, the disclosure of which is incorporated herein by reference, there is described the use of polymers in the manufacture of films used to make fluid containing pouches. These films are characterised as ultra low density linear polyethylene ("ULDPE") and are sold commercially as ATTANE™ by Dow. They are described as a linear copolymer of ethylene with at least one α-olefin having from 3 to 10 carbon atoms, for example, the ULDPE may be selected from ethylene- 1-propylene, ethylene-1-butene, ethylene-1-pentene, ethylene-4-methyl-1-pentene, ethylene-1-hexene, ethylene-1-heptene, ethylene-1-octene and ethylene-1-decene interpolymers, preferably ethylene-1-octene copolymer.

In Meka et al WO 93/03093 published Feb. 18, 1993, the disclosure of which is incorporated herein by reference, there are described metallocene polymers useful for making sealed articles, comprising ethylene interpolymers having a CDBI of at least 50% and a narrow molecular weight distribution or a polymer blend comprising a plurality of said ethylene interpolymers as blend components.

There are now available commercially, metallocene/Zeigler-Natta (Z-N) hybrid interpolymers of ethylene and $C_4$ to $C_{10}$ alpha-olefins that offer just the right combination of property improvements to boost performance of liquid pouches compared to those made with conventional Z-N-LLDPE or pure metallocene interpolymers. For example by selecting the correct resin parameters, it is possible to increase film toughness characteristics such as dart impact strength and puncture resistance, and at the same time provide improved hot tack strength and melt strength.

These new hybrid interpolymers provide superior resins that may be used to produce films of increased toughness characteristics such as dart impact strength and puncture resistance, and at the same time, these films exhibit improved hot tack strength and melt strength. These improvements are particularly apparent in monolayer films, but multilayer films also possess such improvements.

These improved characteristics are of especially positive value since they mean that processing of the resins into films and then pouches is improved considerably. This is of great significance since pure metallocene or single-site catalyst resins have presented considerable processing problems which have precluded them from becoming the resin/film of choice, particularly in the liquid pouch area.

In U.S. Pat. No. 5,582,923 issued Dec. 10, 1996 to Kale et al, all of the disclosures of which are incorporated herein by reference, there is described an ethylene polymer extrusion composition comprising from about 80 to 95 percent, by weight of the total composition, of at least one ethylene/α-olefin interpolymer composition selected from the group consisting of a homogeneously branched linear ethylene polymer composition and a heterogeneously branched linear ethylene polymer composition, wherein the ethylene/α-olefin polymer is characterized as having a density in the range of 0.85 g/cc to 0.940 g/cc and from about 5 to 20 percent by weight, of the total composition, of at least one high pressure ethylene polymer characterized as having a melt index, $I_2$, less than 6.0 g/l 0 minutes, density of at least 0.916 g/cc, a melt strength of at least 9 cN as determined using a Goettfert Rheotens unit at 190° C., a Mw/Mn ratio of at least 7.0 and a bimodal molecular weight distribution as determined by gel permeation chromatography, wherein the ethylene polymer extrusion composition has a melt index, $I_2$, of at least 1.0 g/10 minutes.

SUMMARY OF THE INVENTION

We have now found that the commercially available hybrid interpolymers may be further modified and refined to provide films of improved melt strength, in addition to optimizing the other properties required for a pouch film. As a result, films can be produced which can be used to make pouches that demonstrate superior sealing properties providing significant commercial advantages.

The present invention provides in one aspect a pouch for containing a flowable material, said pouch being made from a film in tubular form and having transversely heat-sealed ends, said film being made from at least one layer of a material comprising from about 50 to about 100 parts by weight of a hybrid interpolymer of ethylene and a $C_3$–$C_{20}$ alpha-olefin made by a polymerization process using both a metallocene catalyst and a Zeigler-Natta catalyst, the hybrid interpolymer having a density of from about 0.910 to about 0.940 g/cm³, a melt index of from about 0.1 to about 2.0 dg/min, and a melt strength of greater than about 3.5 cN as determined using a Goettfert Rheotens unit at 190° C. and from 0 to about 50 parts by weight of a high-pressure polyethylene having a density of from about 0.916 to about 0.924 g/cm³ and a melt index of from about 0.1 to about 10 dg/min.

Preferably the melt strength of the film may range from about 5 to about 20 cN, and most preferably, from about 7 to about 15 cN.

The film used to make the pouch of this invention may be a monolayer or a multi-layer film. The previously referenced patents provide many examples of suitable multilayer structures which may be used to make the pouches of the present invention. In a preferred form of the invention, there is provided a pouch formed from a film material which comprises from about 80 to about 100 parts by weight of the hybrid interpolymer and from 0 to about 20 parts by weight of the high pressure polyethylene. The film material may also comprise about 90 parts by weight of the hybrid interpolymer and about 10 parts by weight of the high pressure polyethylene.

In yet another form of the invention, there is provided a pouch wherein the hybrid interpolymer has a density of from about 0.915 to about 0.930 g/cm³ and a melt index of from about 0.1 to about 1.0 dg./min. Most preferably, the density of the hybrid interpolymer is about 0.920. g/cm³ and the melt index is about 0.5 dg./min.

In another preferred form of the invention, the pouch may be made from a film that comprises a hybrid interpolymer obtained from a multiple polymerization process. The process may comprise at least two reactors in series or in parallel or both, with each reactor having at least one catalyst selected from metallocene catalysts and at least one catalyst selected from Zeigler-Natta catalysts, and the process utilizes both types of catalysts, one in each reactor. Alternatively, both types of catalysts may be used in a single reactor. The process may be set up to produce desired weight fractions of polymers in accordance with known methods in the art. In the present instance, the polymer resins produced may comprise preferably from about 20 to about 80 wt. % of metallocene catalyst derived polymer and from about 80 to about 20 wt. % Zeigler-Natta catalyst derived polymer. More preferably the mixture of weight fractions may comprise from about 40 to about 60 wt. % of metallocene catalyst derived polymer with from about 60 to about 40 wt. % Zeigler-Natta catalyst derived polymer. Most preferably, the proportion is about 50:50 wt. %.

In another preferred form of the invention, the α-olefin for the interpolymer is selected from the group consisting of 1-propylene, 1-butene, 1-isobutylene, 1-hexene, 4-methyl-1-pentene, 1-pentene, 1-heptene and 1-octene.

In another aspect, the invention provides a process for making a pouch for containing a flowable material using a vertical form, fill and seal machine, in which process each pouch is made from a flat web of film by forming a tubular film therefrom with a longitudinal seal and subsequently flattening the tubular film at a first position and transversely heat sealing said tubular film at the flattened position, flattening the tubular film above the predetermined quantity of flowable material at a second position, the improvement comprising making the pouches from a film having at least one layer of a material comprising from about 50 to about 100 parts of a hybrid interpolymer of ethylene and a $C_3$–$C_{20}$ alpha-olefin made by a polymerization process using both a metallocene catalyst and a Zeigler-Natta catalyst, the hybrid interpolymer having a density of from about 0.910 to about 0.940 g/cm³, a melt index of from about 0.1 to about 2.0 dg/min, and a melt strength of greater than about 3.5 cN as determined using a Goettfert Rheotens unit at 190° C. and from 0 to about 50 parts by weight of a high-pressure polyethylene having a density of from about 0.916 to about 0.924 g/cm³ and a melt index of from about 0.1 to about 10 dg/min.

The preferred type of equipment is that which produces a melt through seal and this seal is provided preferably by impulse sealing means.

It is possible to use the film of this invention as a sealant film or as a component in a more complex multi layer structure. Typical structures are those known in the art and which will suit the packaging application and still allow the benefits of the enhanced sealing properties of the metallocene or SSC layer to be taken advantage of in the structure.

The previously referenced patents and applications describe the various processes which may be used to manufacture the pouches of this invention. Vertical form, fill and seal apparatus is used to make the pouches envisaged herein. A flat web of film is unwound from a roll and formed into a continuous tube in a tube forming section by sealing the longitudinal edges together be either a lap seal or a fin seal. This tube is pulled vertically towards a filling station and is then collapsed across a transverse cross section of the tube, the position of which section coincides with a sealing device below a filling station. A transverse heat seal is made at the section providing an air and liquid tight seal across the tube.

The material to be packaged enters the tube above the transverse seal, the tube drops a predetermined distance under the influence of gravity on its load. The sealing device is operated again, and a second transverse seal is made together with a cut through the tube and often through the material placed in the pouch. Thus in this operation, the pouch which has an elongate pillow shape is formed, filled and sealed in a rapid sequence of steps. Many variations of this process are possible and are apparent to those skilled in the art. Examples of typical liquid packaging apparatus used for this type of manufacture are made by Hayssen, Thimonier and Prepac.

The term "flowable materials" as used herein encompasses materials which flow under gravity or which may be pumped. Gaseous materials are not included in this definition. The flowable materials include liquids, for example, milk, water, fruit juice and oil; emulsions, for example, ice cream mix and soft margarine; pastes, for example, meat pastes and peanut butter; preserves, for example, jams, pie fillings, marmalade, jellies and doughs; ground meat, for example, sausage meat; powders, for example, gelatine powders and detergents; granular solids, for example, nuts, sugar and like materials. The pouch of the present invention is particularly useful for liquids, for example, milk.

The resins used to make the film of this invention are preferably extruded in known ways, although other suitable methods may be used, such as those involving laminates, coatings and the like. When blends are used, these may be made by blending the components prior to or at the time of extrusion just prior to remelting in the extruder. A film extruder may be used and the film made using known techniques. An example of a blown film process is found in Canadian Patent No. 460,963 issued Nov. 8, 1949 to Fuller. Canadian Patent No. 893,216 issued Feb. 15, 1972 to Bunga et al describes a preferred method using an external or internal cooling mandrel in the blown film process.

Additives, known to those skilled in the art, such as anti-block agents, slip additives, antioxidants, UV stabilisers, pigments and processing aids may be added to the polymers from which the pouches of the present invention are made. Typically these may comprise up to 5% by weight of total resin components. As previously indicated, when the additional additives and other components reach this proportion, it is important to be sensitive to the desired hot tack strength enhancement for the structure.

As stated previously, the film of this invention may be used in packaging applications where sealing properties, particularly hot tack strength is important. Reference may be had to The Wiley Encyclopaedia of Packaging Technology, 1986, John Wiley & Sons, Inc., under the heading Heat Sealing, the disclosures of which are incorporated herein by reference. Descriptions are found here for all types of heat sealing including bar, band, impulse, wire or knife, ultrasonic, friction, gas, contact, hot melt, pneumatic, dielectric, magnetic, induction, radiant and solvent sealing. Any of these techniques that lend themselves to packaging materials incorporating the film of this invention fall within the scope of this disclosure. Most preferred are packages made by impulse sealing.

DETAILED DESCRIPTION OF THE INVENTION

Melt Strength Measurement

Melt strength determinations are made at 190° C. using a Goettfert Rheotens and an Instron capillary rheometer. The capillary rheometer is aligned and situated above the Rheotens unit and delivers, at a constant plunger speed of 25.4 mm/min, a filament of molten polymer to the Rheotens unit. The Instron is equipped with a standard capillary die of 2.1 mm diameter and 42 mm length (20:1 L/D). The Instron delivers the filament to the toothed take-up wheels of the Rheotens unit rotating at 10 mm/s. The distance between the exit of the Instron capillary die and the nip point on the Rheotens take-up wheels is 100 mm. The experiment to determine melt strength begins by accelerating the take-up wheels on the Rheotens unit at 2.4 mm/s$^2$, the Rheotens unit is capable of acceleration rates from 0.12 to 120 mm/s$^2$. As the velocity of the Rheotens take-up wheels increases with time, the draw down force is recorded in centiNewtons (cN) using the Linear Variable Displacement Transducer (LVDT) on the Rheotens unit. The computerized data acquisition system of the Rheotens unit records the draw down force as a function of take-up wheel velocity. The actual melt strength value is taken from the plateau of the recorded draw down force. The velocity at filament break is also recorded in mm/s as the melt strength break speed.

An example of a commercially available resin which may be modified to produce film for pouches in accordance with this invention is the Dow series of ELITE™ Brand resins.

EXAMPLE

A one week milk pouch packaging field trial was conducted to compare package performance of Octene LLDPE milk pouch film SCLAIR® SM3 film and a film made from Metallocene—Zeigler Natta Hybrid Ethylene-Octene copolymer, identified by the designation Film "A".

The test was conducted in a dairy that runs two Prepac IS6 milk pouch packaging machines that are identical and operate side by side in the dairy. This allowed one line to operate using the SM3 film and the parallel line to operate using the new Hybrid Metallocene—Zeigler Natta copolymer film designated Film "A". The code dates on the milk packaging were colour coded to allow identification of the line from which a returned package was produced and the date of production. The dairy distributed much of its milk through its own dairy store outlets along with some regular supermarkets. Any leaking or damaged packages were returned from the outlet stores or supermarkets to the dairy for credit. For this reason, a very high proportion of leaking packages were returned to the dairy. By examining all returned packages from the test days, (as identified by their code date & code date colour) the cause and frequency of leakers would be assigned to each of the test films evaluated. The cause and location of each leaker was identified and classified into three categories: horizontal seal leakers, vertical seal leakers and physical damage caused by a puncture or tear. The leaker frequency was calculated for each category per 10,000 pouches produced during the test period.

This method of evaluating films is very laborious and time consuming but is the best way to determine comparative performance of films since it looks at all modes of failure. A film may have good sealing performance but may be more prone to physical damage or vice versa. A common goal in the industry is to develop films that perform well in all categories. In the past, pouch drop failure rate has been used to predict performance, and while it is a good general indicator, actual field performance is more definitive because it evaluates films under all misadventures that can cause leakers and not just severe impacts. For example, seal leakers may be caused by a failing seal element or during start-up when seal components are heating up, etc. Physical damage may be caused by abuse during distribution (transportation, loading and unloading, etc.) or packaging machinery used to put milk pouches in bags and then in dairy cases. In summary, this field trial was designed to evaluate films under the actual conditions of use, looking at the three main modes of failure.

The two test lines were operated at the dairy using SM3 and Film "A" during one production week. During the test week 183,456 milk pouches were produced, with each line producing approximately 91,700 milk pouches. All returned packages from that production period were examined over a period of the three following weeks until no more leakers appeared from that period in the daily returns. The two films tested were:

1) SM3, the standard dairy milk pouch film that has been in commercial use for over 10 years and is considered the highest performance milk film available. It contained 85% Ethylene Octene LLDPE copolymer (Sclair 11IL4) and 15% High Pressure polyethylene. The Sclair 11L4 contains slip, antiblock, and extrusion aid as part of its formulation.

2) Film "A" contained 85% of a Hybrid Metallocene—Zeigler Natta Ethylene Octene copolymer. The film contained 10% high pressure polyethylene and approximately 5% additives that include slip, antiblock, and extrusion aid at formulation levels close to those of SM3.

The following results were obtained from this field trial.

| | LEAKER FREQUENCY/10,000 POUCHES | | | |
|---|---|---|---|---|
| Film Seals | Vertical Seals | Horizontal Seals | Physical Damage | Total |
| SM3 | 1.2 | 6.0 | 2.1 | 9.3 |
| Film "A" | 0 | 3.8 | 0.5 | 4.3 |

As can be seen leaker frequency is improved in each category with Film "A". Overall leakers were reduced by about 54% compared to SM3; physical damage was reduced by 76% and combined seal leakers by 47%.

It is clear that the hybrid copolymer provides a completely new balance of properties for this end use that translates into a dramatic improvement in field performance.

The invention may be varied in any number of ways as would be apparent to a person skilled in the art and all obvious equivalents and the like are meant to fall within the scope of this description and claims. The description is meant to serve as a guide to interpret the claims and not to limit them unnecessarily.

We claim:

1. A pouch for containing a flowable material, said pouch being made from a film in tubular form and having transversely heat-sealed ends, said film comprising one or more layers with the sealant layer being made from at least one layer of a material comprising from about 50 to about 100 parts of an interpolymer of ethylene and a $C_4$–$C_{10}$ alpha-olefin made by a polymerization process using at least two reactors and both a metallocene catalyst and a Zeigler-Natta catalyst, the interpolymer having a density of from about 0.910 to about 0.940 g/cm$^3$, a melt index of from about 0.1 to about 2.0 dg/min, and a melt strength of greater than about 3.5 cN 190° C., from 0 to about 50 parts by weight of a high-pressure polyethylene having a density of from about 0.916 to about 0.924 g/cm$^3$ and a melt index of from about 0.01 to about 10 dg/min; and from 0 to about 5 parts by weight of additives selected from the group comprising antiblock agents, slip additives, antioxidants, UV stabilizers, pigments and processing aids.

2. The pouch according to claim 1 wherein the film is a monolayer film.

3. The pouch according to claim 1 wherein the film is a multilayer film.

4. The pouch according to claim 1 wherein the film comprises from about 80 to about 100 parts by weight of the interpolymer and from 0 to about 20 parts by weight of the high pressure polyethylene.

5. The pouch according to claim 1 wherein the film comprises about 90 parts by weight of the interpolymer and about 10 parts by weight of the high pressure polyethylene.

6. The pouch according to claim 1 wherein the melt strength is from about 5 to about 20 cN.

7. The pouch according to claim 1 wherein the melt strength is from about 7 to 15 cN.

8. The pouch according to claim 7 wherein the interpolymer has a density of from about 0.915 to about 0.930 g/cm$^3$, a melt index of from about 0.1 to about 1.0 dg/min.

9. The pouch according to claim 7 wherein the interpolymer has a density of 0.920 g/cm$^3$, the melt index is 0.5 dg/min.

10. The pouch according to claim 1 wherein the α-olefin used in the interpolymer is selected from the group consisting of 1-butene, 1-isobutylene, 1-hexene, 4-methyl-1-pentene, 1-pentene, 1-heptene and 1-octene.

11. The pouch according to claim 1 wherein the film comprises an interpolymer obtained from a multiple reactor polymerization process comprising at least two reactors in series or in parallel, with each reactor having at least one catalyst selected from metallocene catalysts and Zeigler-Natta catalysts, and the process utilizes both types of catalysts.

12. The pouch according to claim 11 wherein the weight fractions of interpolymer resin comprise from about 20 to about 80 wt. % of metallocene catalyst derived polymer component and from about 80 to about 20 wt. % Zeigler-Natta catalyst derived polymer component.

13. The pouch according to claim 12 wherein the weight fractions of interpolymer resin comprise from about 40 to about 60 wt % of metallocene catalyst derived polymer component and from about 60 to about 40 wt. % Zeigler-Natta catalyst derived polymer component.

14. The pouch according to claim 11 wherein the weight fractions of interpolymer resin comprise about 50:50 wt. %.

* * * * *